April 8, 1930.  R. G. GOBER  1,753,372
COMBINATION STOOL, LADDER, AND KITCHEN BLOCK
Filed March 26, 1928
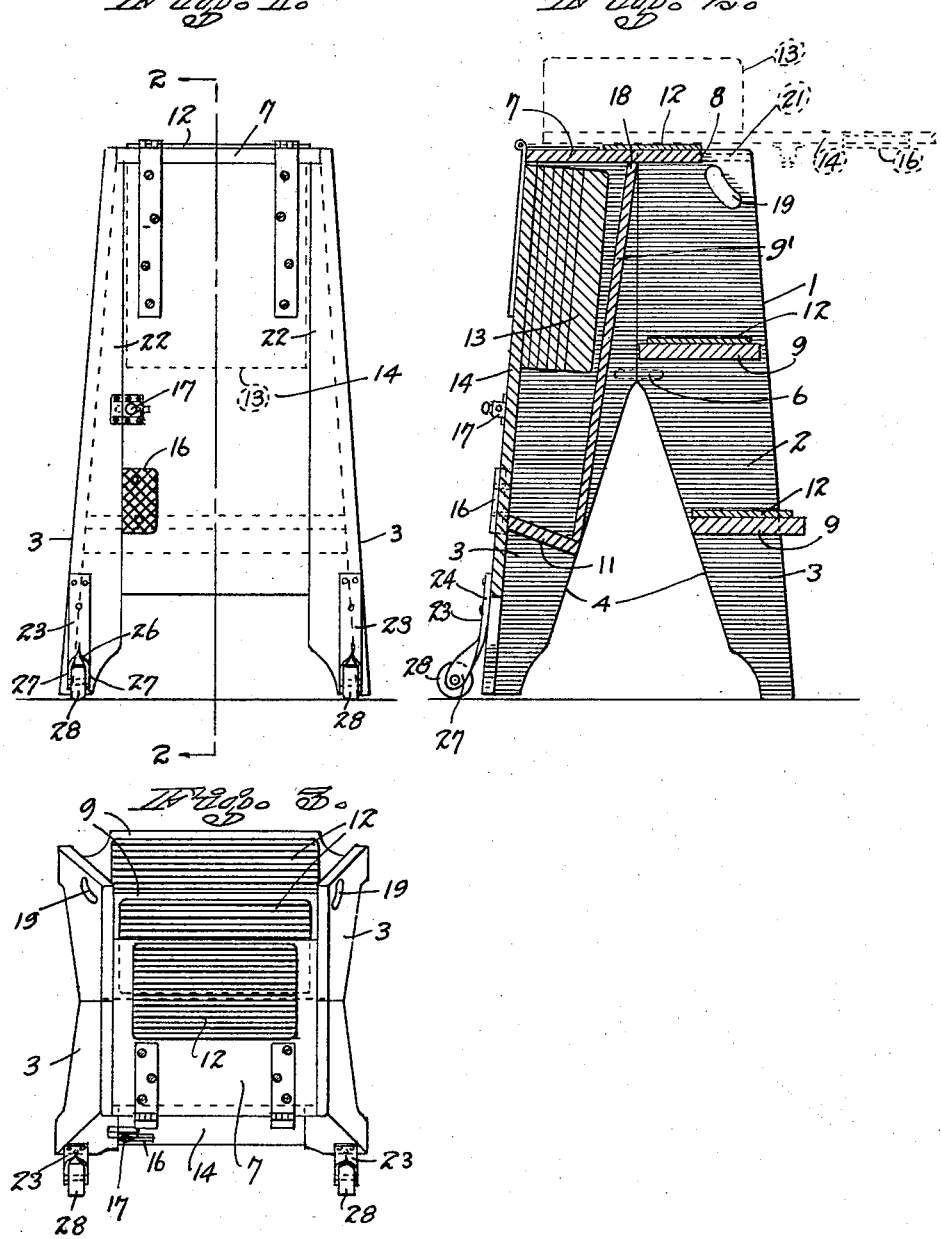
INVENTOR.
RICHARD G. GOBER
BY
ATTORNEYS.

Patented Apr. 8, 1930

1,753,372

UNITED STATES PATENT OFFICE

RICHARD G. GOBER, OF ALAMEDA, CALIFORNIA

COMBINATION STOOL, LADDER, AND KITCHEN BLOCK

Application filed March 26, 1928. Serial No. 264,597.

The present invention relates to improvements in a combination article particularly useful in the kitchen of a modern home. It provides a stool of about the proper height for convenient use for a person to rest on when working in front of the kitchen sink, and is also adapted to be pushed under the sink when not in use. In combination with this stool, I provide steps leading up to it and arranged like the steps of a step-ladder so as to make it easy to reach a position on top of the stool, which is somewhat higher than the ordinary kitchen chair, and brings within reach certain objects along the kitchen wall that may not be conveniently reached otherwise. It is further proposed to combine with this stool a meat block adapted to be swung from a position on top of the stool to a concealed position between the legs of the stool. The idea of the hinged block is not only to keep the same clean while the device is used as a stool, but also to raise the height of the stool to that of a kitchen table, which makes it very convenient to chop or cut meat on the block. I furthermore associate with the block a shelf to which a meat grinder may be attached, and which may be used for various other purposes, and is swung with the block into a concealed position.

Further objects and advantages are obtained by the specific structural features of my device which will appear in the following specification.

The preferred form of my invention is illustrated in the accompanying drawing, in which Figure 1 shows a rear view of my combination article, Figure 2 a vertical section taken along line 2—2 of Figure 1, and Figure 3 a top plan view of the same.

While I have shown only the preferred form of my invention, I wish to have it understood that various changes or modifications may be made within the scope of the claims hereto attached without departing from the spirit of the invention.

In its preferred form, my combination article comprises a stool 1, including the two legs 2 arranged in spaced relation and spreading slightly toward the bottom. Each leg is preferably made of two pieces 3 having tapered edges 4 along the lower portions thereof so as to form a V as indicated in Figure 2 when joined together. The joint between these two sections is preferably reinforced by means of dowel pins 6.

On these two legs there is supported a platform 7 the front edge 8 of which recedes somewhat from the front edge of the legs. Two horizontal braces 9 between the legs are arranged in step-ladder fashion so that a person may conveniently step from one to the other to reach the top of the stool. A substantially vertical brace extends between the two legs and forms the rear wall of a cabinet the bottom of which is furnished by a shelf 10. The steps as well as the vertical member 9 are preferably sunk into the walls of the legs, and the steps are provided with suitable mats 12.

Hinged to the upper rear edge of the platform 7 is a meat block 13 of substantially the same dimensions as the top of the stool so as to lie on the same when the block is swung into active position. The block is preferably made of different layers of wood, it only being necessary that the outer layer be made of first-class quality material. A shelf 14 extends from the block beyond the stool, and may be conveniently used to support a meat grinder or the like, for which purpose a U-shaped metal plate 16 is fastened upon the edge of the shelf which allows a meat grinder to be firmly clamped thereupon.

When the block and the shelf are swung downwardly into inactive position, they form a closure for the cabinet, and may be held in place by any suitable locking means 17. The vertical bracing member 9 is lightly spaced from the platform as shown at 18 to allow of ventilation of the cabinet for drying the block in case the same should be moist after having been used.

A slot 19 is cut near the upper corner of each leg to allow of convenient handling of the device. Dowel pins 21 are provided above these slots to reinforce the wood material.

The two legs are formed with inwardly turned flanges 22 along their rear edges, these flanges serving as a frame for the swinging block and shelf. At the lower end of these flanges there are provided two casters 23. Each caster comprises a small plate 24 of spring material slit at the lower end as shown at 26 and bent to present two parallel sections 27 between which is journalled a wheel 28. The casters are arranged in such a manner as to normally keep the rear edge off the floor and to allow the device to be rolled over the floor with ease. When the device is used for chopping meat or similar operations, the spring casters give a certain resiliency to the entire device which serves as a shock absorber. When the device is used as a step-ladder, the spring casters yield sufficiently to allow the rear edge to come in firm contact with the floor so that at such time the device rests solidly on the floor.

The manner of using my invention will be readily understood from the foregoing description. Normally, the device may be used as a kitchen stool, and is of convenient height for a sink stool and similar purposes. When it is desired to use the device for chopping or cutting meat, the block 13 is swung upward on its hinge into the dotted-line position shown in Figure 2. This adds to the height of the device and makes for more comfort in handling the meat on the block, and at the same time provides a shelf which may be used for cutting operations or for attachment of a grinder or similar purposes. After the meat block has been used, it is swung back into the position shown in full lines in Figure 2 so that the block is protected from dust while subject to ventilation through the aperture 18, which allows moisture that may have gathered on the meat block to escape. The maner of using the device as a step-ladder is apparent, and there needs only to be pointed out that in this case the casters yield sufficiently to allow the legs of the stool to stand firmly on the ground surface.

I claim:

1. In a combination furniture of the character described, a stool comprising two side members and a top member, a series of steps supported by the two side members and leading to the top from in front, a block hinged to the rear edge of the top for swinging motion from a position on top of the stool to a concealed position between the sides of the same and a partition interconnecting the sides for bracing the same and for separating the steps from the block in its concealed position.

2. In a combination furniture of the character described, a stool comprising two side members and a top member, a series of steps supported by the two side members and leading to the top from in front, a block hinged to the rear edge of the top for swinging motion from a position on top of the stool to a concealed position between the sides of the same, a partition interconnecting the sides for bracing the same and for separating the steps from the block in its concealed position, the block having an extension projecting beyond the stool for forming a shelf when the block is on top of the stool and co-operating with the partition in forming an enclosure for the block when the latter is in a concealed position.

3. In a combination furniture of the character described, a stool comprising two side members and a top member, a series of steps supported by the two side members and leading to the top from in front and a block hinged to the rear edge of the top for swinging motion from a position on top of the stool to a concealed position between the sides of the same, the block having an extension projecting beyond the stool for forming a cutting surface when the block is on top of the stool and forming a closure for the rear of the stool when the block is in concealed position.

RICHARD G. GOBER.